United States Patent [19]
Taylor

[11] 3,925,796
[45] Dec. 9, 1975

[54] CAMERA APPARATUS FOR MAKING PHOTOGRAPHIC IMAGES ON MOVING CUT FILM PIECES

[76] Inventor: John J. Taylor, 539 S. San Marcos Road, Santa Barbara, Calif. 93111

[22] Filed: Aug. 22, 1973

[21] Appl. No.: 390,379

[52] U.S. Cl. .................................. 354/180; 354/180
[51] Int. Cl.² ........................................ G03B 19/10
[58] Field of Search ............. 95/15, 31; 354/66, 180

[56] References Cited
UNITED STATES PATENTS

| | | | |
|---|---|---|---|
| 559,246 | 4/1896 | Wood | 95/15 |
| 831,426 | 9/1906 | Goddard | 95/15 |
| 1,586,071 | 5/1926 | Cooke | 95/12.5 |
| 1,670,861 | 5/1928 | Ludowici | 354/180 |
| 2,043,539 | 6/1936 | Harrison | 95/31 |
| 2,485,119 | 10/1949 | Steiner | 354/66 |
| 2,602,386 | 7/1952 | Brigham | 95/26 |
| 3,653,309 | 4/1972 | Ochiai | 95/26 |
| 3,715,963 | 2/1973 | LeCover | 95/31 |

FOREIGN PATENTS OR APPLICATIONS

| | | | |
|---|---|---|---|
| 489,084 | 8/1918 | France | 95/15 |
| 1,009 | 4/1865 | United Kingdom | 95/15 |

*Primary Examiner*—John M. Horan
*Attorney, Agent, or Firm*—Bosworth, Sessions & McCoy

[57] ABSTRACT

Camera apparatus is disclosed in which pieces of unexposed film are moved past a lens at a predetermined speed by pinch rolls which grip the film. In one embodiment, the film is moved adjacent a partition between the film and lens and exposure of the moving film takes place through a narrow slot in the partition which slot extends transversely of the film and intersects the optical axis of the lens. In another embodiment, no such slot is used and the moving film is exposed to the full field of view for full frame exposure.

10 Claims, 17 Drawing Figures

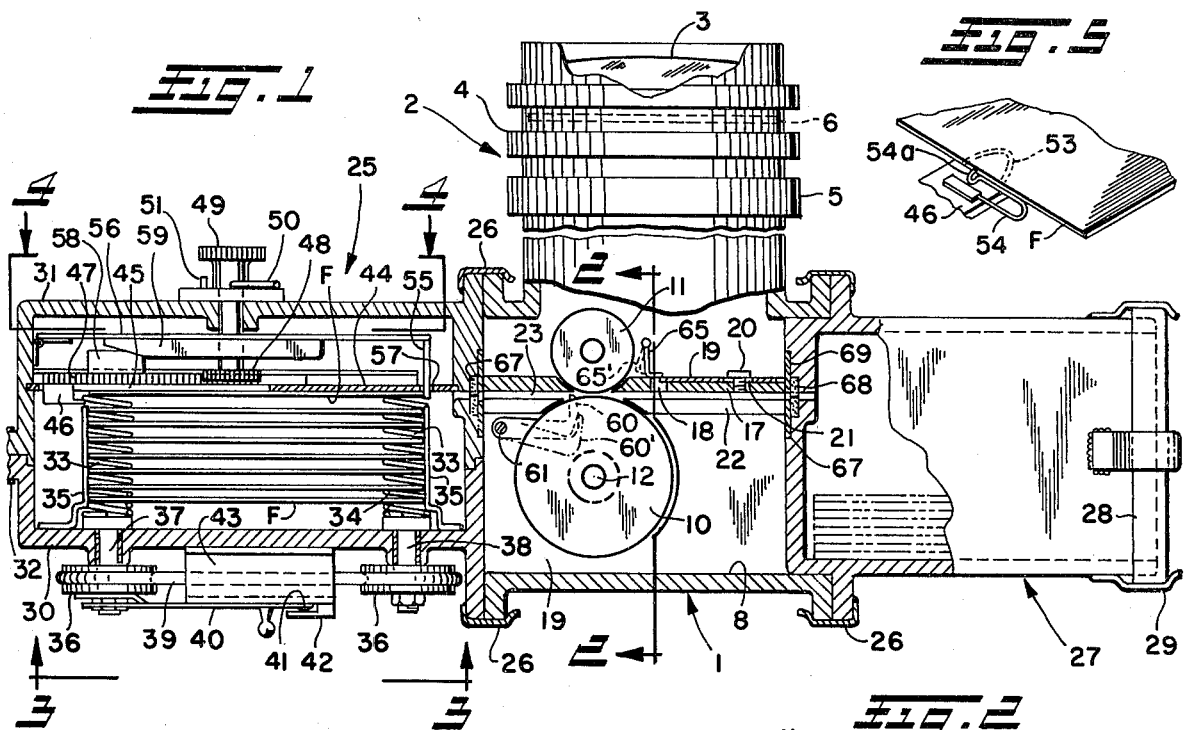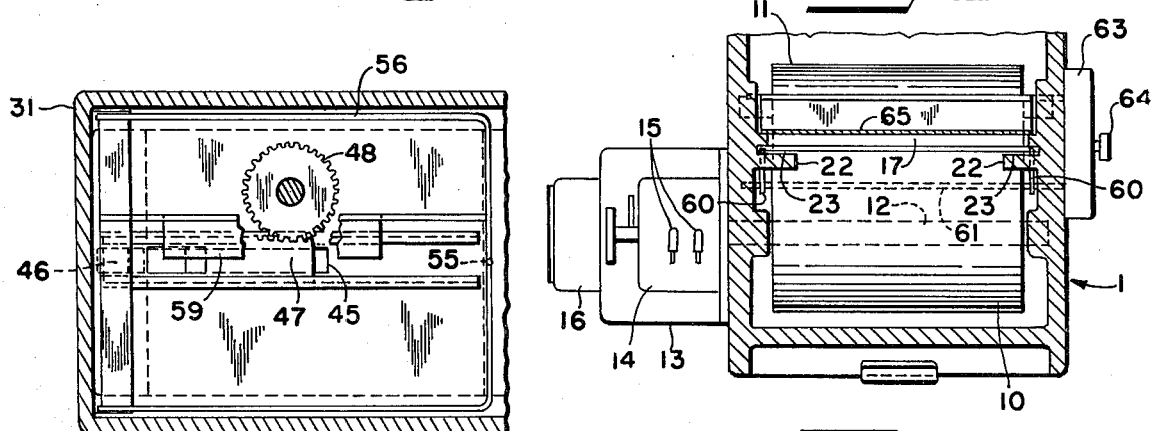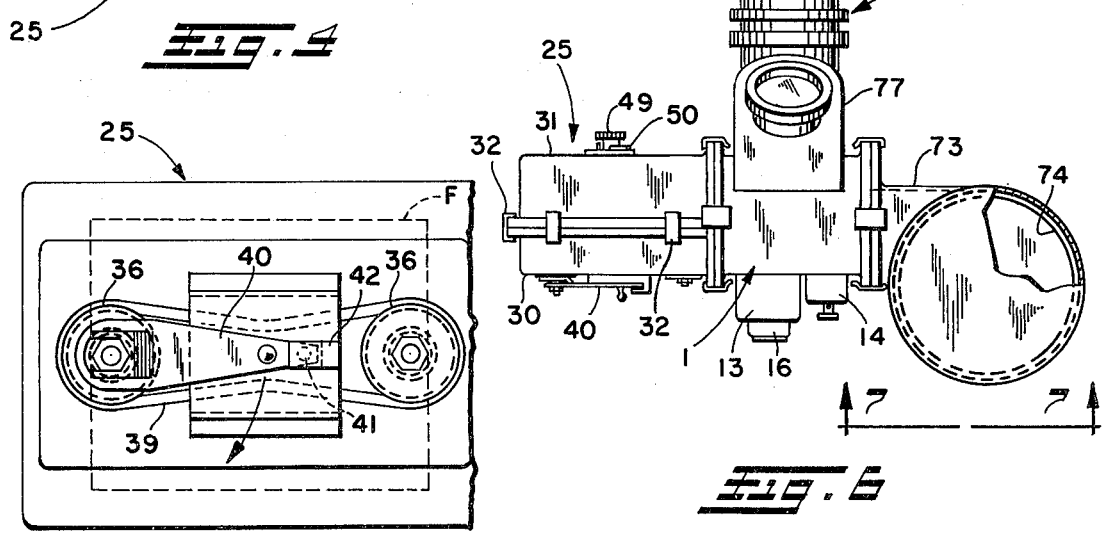

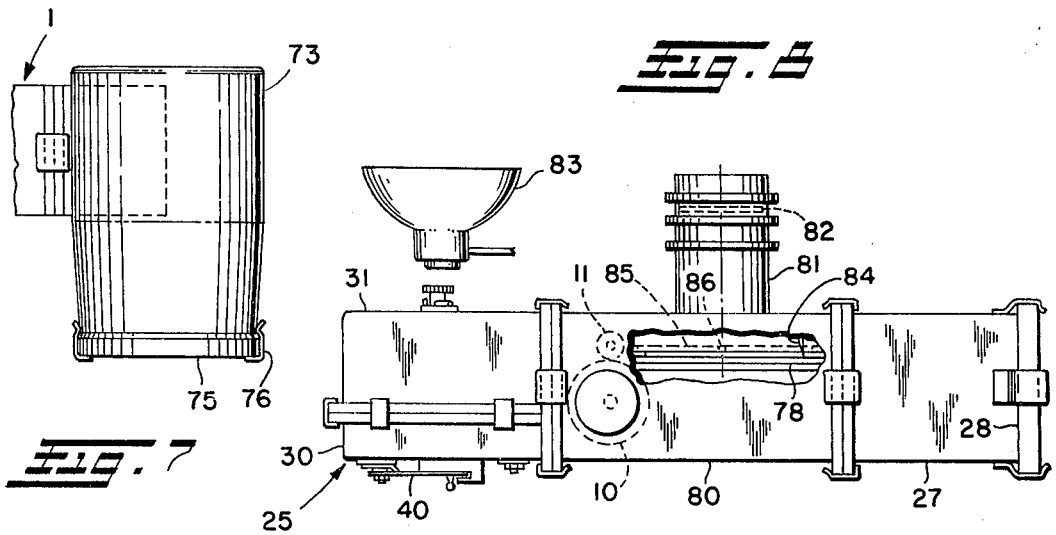
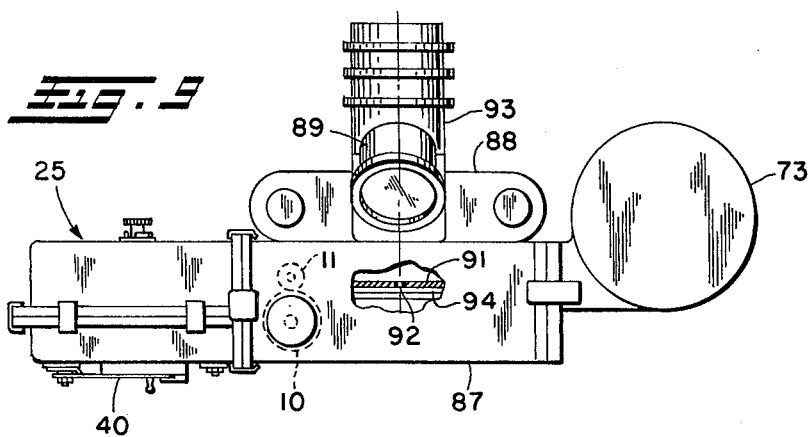
Fig. 13a
Fig. 13b
Fig. 13c

CAMERA APPARATUS FOR MAKING PHOTOGRAPHIC IMAGES ON MOVING CUT FILM PIECES

This invention relates to photographic camera apparatus and more particularly to camera apparatus useful as an image motion compensation camera for photographing moving objects, particularly those moving at high speeds.

Most prior cameras for photographing moving objects move a strip of film past an aperture aligned with the lens. When it is desired to photograph objects moving at high speed and compensate for image motion, the film strip must be moved at high speed. A large length of film is required for even a short exposure time; and a substantial additional length of film is used in accelerating to the desired speed and decelerating to a halt the strip of film, the roller from which it is unwound, and the roller on which it is wound after the image is photographed.

Consequently, use of such a camera involves high costs for film and for developing and processing the film. Moreover, strip film cameras and their associated equipment are bulky and expensive because of the necessity for handling large packages of film.

Other types of prior image motion compensation cameras that do not use strip film, such as cameras utilizing drums or prisms include complicated and expensive mechanisms, lenses and other items, are usually complicated to operate, and often easily get out of order.

SUMMARY OF THE INVENTION

The present invention provides camera apparatus that can overcome these and other disadvantages and also provide important advantages. The present invention provides a camera adapted to take high speed photographs of objects traveling within a wide range of speeds, which camera utilizes pieces of film, which may be relatively short as of the type ordinarily commercially sold as cut film. The camera passes the cut film past an aperture aligned with the lens, preferably by rotating pinch rolls, at least one of which is positively rotated at a predetermined adjustable speed. The camera preferably embodies means for feeding in sequence several lengths of cut film to and through the pinch rolls. The pinch rolls are located and driven so they engage, rapidly accelerate, and move each film piece past the aperture at a desired predetermined highly uniform speed, without obscuring the aperture. The exposed piece of film is then received in a light-tight storage compartment or receiver from which it may be removed under the usual conditions of protection from harmful light.

According to one embodiment of the invention, the film piece is moved past a slot of suitable width, predetermined for the speed and other conditions. If desired, the width of the slot may be adjustable.

According to another aspect of the invention, no slot is used but the cut film piece is moved by the pinch rolls past a lens so essentially the full field of view is exposed on the film.

The invention provides camera apparatus suitable for photographing moving objects, particularly those moving at high speeds, which camera may be simple in construction and operation, and less costly and prone to trouble than prior cameras, and can be operated at lower costs because of the small amounts of film that need be used and processed.

BRIEF DESCRIPTION OF THE DRAWINGS

Advantages, features and objects of the invention will be apparent from the following description of preferred embodiments of the invention in connection with the accompanying drawings in which:

FIG. 1 is a plan elevation of a camera embodying the invention, parts including the viewfinder being broken away or omitted to show the magazine for holding and transporting unexposed film pieces to the pinch rolls, the means for receiving exposed film pieces, as well as other parts of the camera;

FIG. 2 is a section along line 2—2 of FIG. 1 and to the same scale, showing the pinch rolls;

FIG. 3 is a view from line 3—3 of the film magazine of FIG. 1, to the same scale;

FIG. 4 is a section along line 4—4 of the film magazine of FIG. 1, to the same scale;

FIG. 5 is a perspective view, showing a spring in the film magazine for pushing a film piece toward the pinch rolls, when the film piece is released;

FIG. 6 is a plan external view to a smaller scale of a similar camera embodying the invention, but having a different type of film receiver;

FIG. 7 is a view from line 7—7 of FIG. 6 and to the same scale;

FIG. 8 is a side view of another camera embodying another version of the invention, in which there is no slot and film pieces moved by pinch rolls may be exposed to the whole field of view of the lens;

FIG. 9 is a view of another embodiment of the invention showing how a standard camera can be mounted on an auxiliary body embodying pinch rolls, which camera is shown as embodying a slot but can also be adapted to have the plate containing the slot removed so it can operate as does the camera of FIG. 8;

FIGS. 13a, 13b and 13c are views of a stream of water horizontally projected as from a hose, the photographs being taken by a camera operating as does the camera of FIG. 1, showing the condition of the water different distances from the point at which the water is emitted;

DESCRIPTION OF PREFERRED EMBODIMENTS

Figure 14:
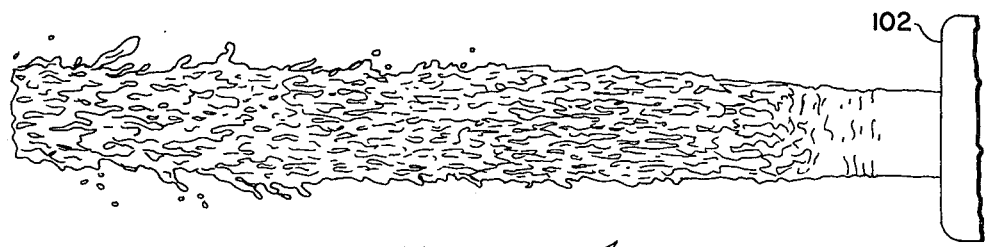
FIG. 14 is a view of an image of a stream of water being projected from a conduit, taken with the camera operating as does that of FIG. 8.

The camera of FIGS. 1 to 5 inclusive comprises a body 1 on which is mounted a barrel 2 containing a lens system 3, lens aperture adjusting means 4, focusing means 5, and if desired, a shutter 6, the shutter being operable by suitable conventional means not shown and also adapted to be held fully open; all of these parts may be conventional and conventionally operated.

The body 1 has a chamber 8 in which are rotatably mounted two pinch rolls 10 and 11. The larger pinch roll 10 which is mounted on shaft 12, can be positively driven at a suitable pre-determined speed, which may be adjustable, by a known electric motor 13 connected through a known switch 14 for starting and stopping the motor and adjusting its speed, to wires 15 that supply electrical energy from a suitable source such as a battery not shown. A known type of speed indicator 16, driven from motor shaft 12, is used to permit proper adjustment of the speed of roll 10. The smaller roll 11 is an idler roll that is adapted, as by being spring loaded, to cooperate with roll 10 to grip the film piece firmly and without slippage. The rolls have surfaces of soft rubber or other material that will firmly grip the film piece without damaging it or its photosensitive coating.

Body 1 also has a partition 17 extending across the field of view of the lens and having a transverse slot 18; the slot is preferably a straight slot parallel to the axes of the rolls 10 and 11. The width of the slot is shown as preferably adjustable by a plate 19 held in place by screws 20 extending through elongated openings 21 in the plate.

Body 1 also includes ledges 22 that cooperate with partition 17 to form guide grooves 23 that engage and guide the edges of a piece of cut film F that is transported by rolls 10, 11 at a predetermined, preferably high, speed past the slot 18 with the emulsion or photosensitive side of the film facing the lens 3 while it is open.

Pieces F of cut film of suitable commercial size, film speed, and other desired characteristics are supplied and fed to the rolls by film supply unit or magazine 25 that is demountably held on one end of body 1 by spring clamp members 26 that engage and extend over suitable flanges on the body and magazine.

Exposed film pieces are discharged from the other end of body 1 into a film receiver 27 that also is demountably held on body 1 by spring clamp members 26 engaging suitable flanges on the body and receiver. Receiver 27 also has a cap 28 on one end demountably held in place by clamp members 29, and is adapted to be removed for removal of the film.

Film supply magazine 25 is designed to hold a store of spaced unexposed cut film pieces F in spaced parallel relation, and to feed them into the guide slots 23 and between pinch rolls 10 and 11. Magazine 25 comprises a light-tight enclosure made up of portions 30 and 31 demountably held together by spring clamps 32.

One of portions 30 rotatably carries conveyor members 33 each formed by number of helical turns 34 of stiff coiled wire, the spacing between members 33 and between the turns of these members being such that the helical turns can support film pieces F in spaced parallel relation. When members 33 are rotated in the same direction and in unison they move the film pieces longitudinally of the helical members to a position where they can be discharged into the pinch rolls and guide grooves. Guides 35 adjacent members 33 prevent lateral movement of the film pieces.

Members 33 are rotated in unison by pulleys 36 mounted on the ends of shafts 37, 38 that are journaled in housing portion 30 and embodying portions upon which turns 34 are mounted. A belt or other suitable endless strand 39 engages the pulleys. The pulleys are rotated by crank 40 fixed to the end of shaft 37, the crank having a handle by which it is turned and a protuberance 41 that can engage a depression in resilient member 42 fixed to a bracket 43 on portion 30. The parts are so designed that one rotation of crank 40 from the position of FIG. 3 in which protuberance 41 engages member 42 back to such position rotates helical members 33 sufficiently to advance each film piece F one turn, and advance the last film piece in the last turns 34 to a position where it can be discharged into the pinch rolls and guide grooves 23.

Magazine 25 also comprises means for laterally transferring such last film piece F from members 33 to a location where it can be gripped by pinch rolls 10, 11. Such means comprises a plate 44 fixed in housing portion 31 and having a guide slot 45 located at one side of members 33, in which slot travels a pusher member 46 that can engage the last film piece while it is located between the ends of helical conveyor members 33 and plate 44 and move each piece toward the pinch rolls. Member 46 is fixed to a rack 47 slidable along slot 45 and is moved away from and toward the pinch rolls by rotation of a gear 48 engaging the rack. Gear 48 is rotated as required by manually operated knob 49 which preferably has a pin 50 adapted to engage stop means 51 to limit rotation of the gear and the corresponding movement of the pusher member the proper amount in either direction.

A clip 53 (FIGS. 1, 5) is mounted on the pusher member so that the edge of the last film piece F remote from the pinch rolls can be engaged between the clip and plate 44. A flat compressible spring 54 made up of a U-shaped piece of wire with a film engaging hook 55, is mounted on pusher member 46 so that the spring will engage such edge of the film and be compressed when the opposite edge of the film piece is held against movement.

A pin 55 is fixed to a member 56 that extends longitudinally and is resiliently mounted in housing portion 31, so that the pin can move between an extended position to which it is biased and in which it projects through an opening 57 in plate 44 (FIG. 1) to contact the last film piece at its edge nearest the pinch rolls to prevent its longitudinal movement, to a retracted position in which the pin clears the film piece so that it can be moved toward the pinch rolls by spring 54 on pusher member 46. The pin 55 is retracted by a cam 58 fixed on slidable rack 47 that engages a cam portion 59 fixed to member 56.

Two stop members 60 are rigidly mounted on a rotatable shaft 61 that extends across body 1 parallel to the pinch rolls. The thus pivotally mounted members 60 are located at the ends of the roll 10 to engage the last film piece at its edge nearest the rolls and prevent the piece from entering the rolls after pin 55 is retracted and the film piece is moved toward the rolls by pusher 46. Members 60 are pivotally moved to a retracted position, shown in broken lines 60' (FIG. 1) by suitable electrical or mechanical means 63 actuated by push button 64. Preferably means 63 provides an interlock to actuate simultaneously a light gate 65 that normally closes slot 18 to prevent light passage into body 1 through lens 3. The stops 60 and shield member 65 are interlocked so that when the stops 60 halt the film the gate 65 closes slot 18, and when the stops are retracted the gate 65 is also retracted to position 65' to open the slot 18.

Housing portion 31 also embodies a light shield 67 to prevent passage of light between the interiors of camera body 1 and magazine 25. Receiver 27 has a similar light shield 67 between the interiors of body 1 and the receiver. Each shield 67 comprises a felt pad 68 removably held by a plate 69, both having slots which the film can pass. If desired, the light shield 67 between the body 1 and the receiver may be a light gate similar to gate 65 and be interlocked with gate 65 to open when film piece is to enter the receiver so as to permit the film to pass without resistance into the receiver, which is particularly desirable for high speed operation.

Knob 49 is turned if necessary to move pusher member 46 to the end of its retracted path to the left in FIG. 1, so its clip 53 and spring 54 will clear the last film piece in the conveyor members 33 of the magazine.

To use the camera, crank 40 is then manually moved if necessary to insure that a film piece is moved to the last position in the conveyor members as shown in FIG. 1, from which it is ready to be transferred to the pinch rolls. Knob 49 is then turned to cause pin 55 to retract so it frees the film piece, the turning being continued until the pusher member 46 engages the film piece and pushes it through magazine light shield 67 to a position where its end nearest the pinch rolls engages the stop members 60 located in their extended stop position to which they are biased. The pinch rolls are started rotating and their speed adjusted to a predetermined speed by use of control switch 14 in conjunction with speed indicator 16. The previously focus-adjusted camera is then directed toward the moving object and the button 64 is moved to retract the stops 60 and open the light gate 65. The spring 54 then rapidly pushes or snaps the film piece between the rotating pinch rolls, which grip the film piece and propel it rapidly past slot 18. By the time the leading edge of the cut piece of film reaches the slot, it has been accelerated and is traveling at full uniform speed at which it is moved across the slot 18. As the film travels past the slot the film is exposed and the image photographed.

Thereafter the knob 49 is fully turned in the opposite direction, causing pusher member 46 to move to its extreme left position in FIG. 1, and pin 55 to move simultaneously to its projecting position through plate 44. Crank 40 can then be turned to rotate helical conveyor members 33 to move another piece of cut film into the last position from which it can be transferred laterally toward the pinch rolls.

Suitable intercoupling means, not shown, may be provided so that rotation of knob 42 to move pusher member 46 in its return stroke can be used to rotate helical conveyor members 33 so that the next film piece can be moved to the last position.

After the desired number of photographs have been taken, or after all of the film pieces in the magazine 25 have been used, the exposed film, by suitable darkroom techniques, can be removed from receiver 27 after removal of the cap 28 and conventionally developed or otherwise processed.

FIGS. 6 and 7 illustrate another embodiment of the invention in which all parts of the camera are the same as those in FIGS. 1 to 5, and the camera is operated in the same manner as that of FIGS. 1 to 5, except that receiver 73 for the exposed film is different. Receiver 73 is generally cylindrical and is lined with a layer of felt or similar material 74 on its curved interior walls as well as on its ends. A light shield similar to the light shield 67 or a light gate similar to light gate 65 of FIG. 1 is used between receiver 73 and the camera body 1. Each exposed film piece that is projected by the pinch rolls into the receiving unit is decelerated without harm, by the curved walls of the receiver and by the layer 74 which protects and decelerates the film, the film piece being stored in the unit. After the desired number of pieces of film are in the unit, the end cap 75; which is held in place by means of spring clamps 76, may be removed in a darkroom and the exposed pieces of cut film removed and processed by suitable known techniques.

FIG. 6 also shows a viewer 77 of known type to permit viewing of the scene and focusing through the lens of the camera. The camera of FIGS. 1–5 may have a similar viewer.

FIG. 8 illustrates another modification of the invention, a camera in which no transverse slot is used but in which a piece of cut film is moved by pinch rolls 10 and 11 through edge guide slots 78 across the full field of view inside of the camera.

In the illustrated embodiment, the camera body 80 has a conventional barrel 81 embodying a lens system and a between-the-lens shutter 82 operated in conventional manner. Cut film pieces are supplied from magazine 25 that may be identical to the magazine 25 of the embodiment of FIGS. 1 to 5. The exposed film pieces are received in the receiver 27 which may be identical with receiver 27 of FIGS. 1 to 5.

Body 80, however, differs from body 1 of FIG. 1 in that the pinch rolls 10, 11 and barrel 81 are offset and located relatively to each other and to the camera body so that, even though the film is exposed to the full field of view, the pinch rolls will not be in the photograph, the barrel 81 being offset laterally from the pinch rolls a greater distance than in the embodiment of FIGS. 1–5. Therefore, substantially the whole area of the film piece can be simultaneously exposed to the full field of view from the lens as the film piece is propelled through the slots by the pinch rolls. Photographs can therefore be easily taken of episodes in which both the object and the background are shown with substantial clarity, if the motion is either relatively minor or in more than one direction. The pinch rolls may be supported, driven and controlled as in the embodiment of FIGS. 1–5.

Desired film exposure may be achieved by operation of the shutter 82 if the object photographed is sufficiently lighted, or by flash unit 83 which may be actuated by movement of the film, as by means such as diagrammatically indicated biased trigger 84 that is moved by a side of the leading edge of the film piece as it approaches the receiver 27 so the trigger can operate the flash unit as the film is located behind the lens. Preferably the electronic flash has a duration of 1/10,000 to 1/50,000 second. The camera of FIG. 8 may be otherwise operated in the same manner as the camera of FIGS. 1–5.

If desired, the camera of FIG. 8 may be also adapted for slot photography by installing a removable partition 85 having slot 86 as shown in broken lines in FIG. 8; the apparatus can then be used as described above in connection with FIGS. 1 to 5 for slot photography. Partition 85 can be removed if the apparatus is to be used for full view exposure of the film.

FIG. 9 shows another camera apparatus embodying the invention, comprising a body 87 on which is demountably attached a film supply magazine 25 like that of FIGS. 1–5 and a film receiver unit 73 like that of FIGS. 6, 7, in which the apparatus shutter and lenses are part of a conventional single lens reflex camera 88 from which the back has been removed, which openbacked camera is mounted on body 87 in fixed light-tight arrangement. A known viewer 89 is mounted as shown to permit examination of the field of view from above the camera before actuation of the camera to take photographs.

Body 87 contains pinch rolls 10, 11 that can be controlled and driven at predetermined uniform adjustable speeds by means like that of FIGS. 1–5. The body also contains a partition 91 having a transverse slot 92 intersecting the optical axis of the camera lens in barrel 93. The body also contains guide grooves 94 to engage the edges of pieces of film propelled by the pinch rolls past slot 89 on the side of plate 88 opposite that facing the lens, so that photographs may be taken as described above in the apparatus of FIG. 1–5. The means for driving and adjusting the pinch rolls, for transporting the film and releasing the film in magazine to the pinch rolls, and for releasing the film are all associated with or in body 87, and may otherwise be the same as discussed above with FIGS. 1–5.

The apparatus of FIG. 9 is shown as used for slot photography. However, partition 91 may be removable, and when it is removed the apparatus of FIG. 9 can be used for full view exposure on the film piece, as described above in connection with FIG. 8.

Figure 10:
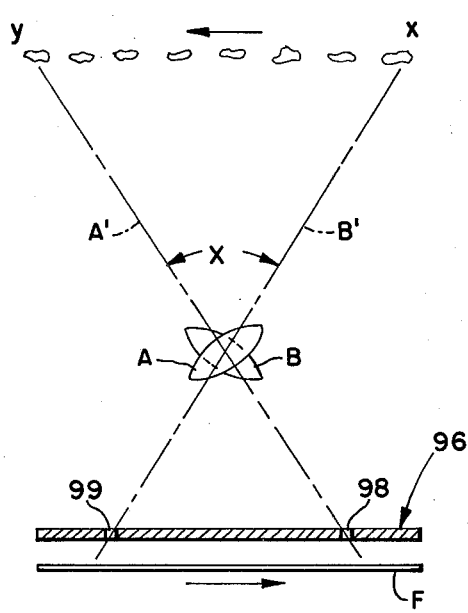
FIG. 10 is a diagrammatic view of how photographs of a moving image can be taken through a double lens camera embodying the invention in which the lenses are at angles to each other.
Figure 11:
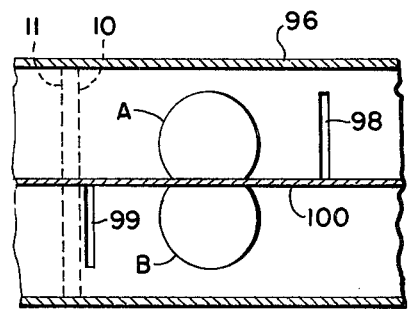
FIG. 11 is a diagrammatic view of such a camera showing the lenses from inside of the camera, and the positions of the lenses relative to each other.
Figure 12:
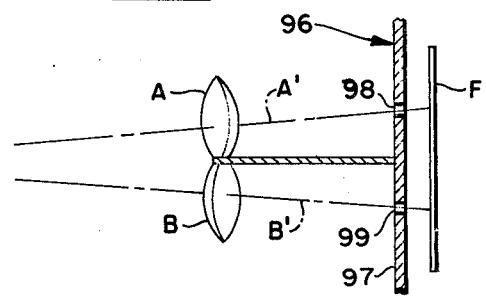
FIG. 12 is a side view of the lenses in such a camera.

FIGS. 10 to 12 inclusive diagrammatically illustrate another camera and its operation embodying a plurality, in this case two, lenses A and B arranged one above the other in the camera with the optical axes of the lenses at an angle. Each of the lenses projects an image through its own slot.

More specifically, as shown in these figures, the lenses A and B are disposed one above the other in the camera 95 with their optical axes A' and B' at an angle X relative to each other, this angle being any one of a wide range of angular positions depending on the photography to be accomplished.

More particularly as indicated in FIG. 10, the lenses A and B are mounted in light-tight relation in a camera body 96 which is light-tight except for the lenses. Body 96 includes a partition 97 provided with slots 98 and 99 extending transversely of and preferably at right angles to the direction of travel of a piece of film F on the side of partition 97 opposite to that facing the lenses A and B. The slots may be adjustable as to width as indicated above in FIGS. 1–5. Slot 98 intersects the optical axis A' of lenses A and slot 99 intersects the optical axis B' of lens B. Pinch rolls 11 and 12 and associated driving and control apparatus as disclosed in the preceding embodiment propel pieces of cut film F supplied by a magazine such as magazine 25 of FIGS. 1–5, past the slots 98, 99 to a receiver such as receiver 27 of FIGS. 1–5. The lenses themselves are separated by another light-tight partition 100 which extends in the camera body 96 from the lenses to the slotted partition 97. If desired, the angle between the optical angle of the lenses may be made adjustable, and partition 97 may be replaceable by other partitions having slots spaced accordingly.

In use of a camera with two lenses as described above, when the lenses are positioned directly above each other and when the film speed is adjusted so that the time for the film to move from slot 98 to slot 99 is substantially the same as for an object to move from position x to position y (FIG. 10) two images will be photographed on the same piece of film.

FIGS. 13a, 13b and 13c depict photographic images photographed by a camera like that disclosed in connection with FIGS. 1–5, or FIG. 9, utilizing a slot. The photographic images are of a moving stream of water projected horizontally from a nozzle, not shown. The stream was projected from a garden hoze nozzle at a substantially constant water pressure of 60 p.s. i.g. All of the photographs were taken with the slot camera at the same distance from the stream but at different distances from the nozzle from which the stream was emitted, and all were taken at a film speed of 600 inches per second. FIG. 13a shows the stream at a distance of 3 feet from the nozzle; FIG. 13b shows the identical stream at a distance of 6 feet from the nozzle; and FIG. 13c shows the same stream at 9 feet from the nozzle. The changes in the stream and its break-up into drops are clearly shown by the photographs.

FIG. 14 depicts the photographic image of a similar stream of water emitted from a garden hose nozzle 102 at the same rate of water speed, the photograph being taken by a camera of the type disclosed in connection with FIG. 8, in which the film piece is moved by the pinch rolls at a speed of 600 inches per second while having a full field of view exposure. As can be seen, the shape of the image is very different from those of FIGS. 13a, b, and c, resulting from slot photography.

Figure 15:
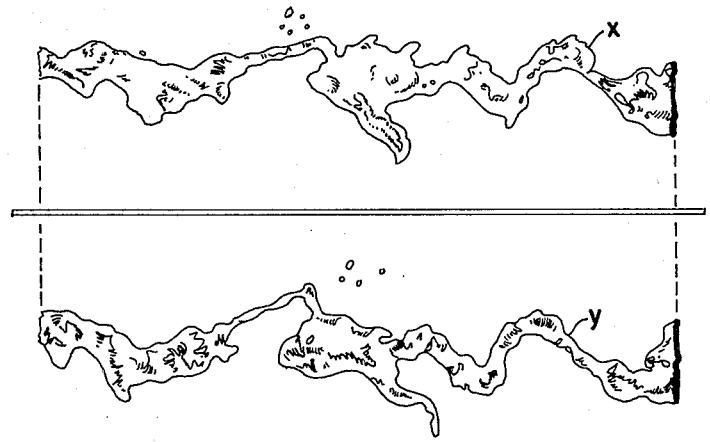
FIG. 15 is a view of a stream of water depicting two images of the same stream taken by a camera having the lens arranged as shown in FIGS. 10–11, showing the differences in the images caused by the slight difference in position of the stream due to the movement of the water.

FIG. 15 depicts the image of a photograph of a horizontally projected stream of water, which photograph was taken by a double lens camera as disclosed above in connection with FIGS. 10–12. These figures were taken by such a camera at a film speed of 750 inches per second with a time delay of 0.0025 second between the time in which the first image x was photographed and the time that image y was photographed. The differences in the shapes of the identical stream due to the time interval are apparent by comparison of images x and y of FIG. 15.

The apparatus of the present invention provides numerous important advantages among which are the following.

Compared with most if not all existing image motion compensation cameras, the apparatus of the invention can use standard cut film rather than long lengths of strip film. This is a great advantage, particularly if the film speed at the instant of exposure is high.

Thus, with the apparatus of the present invention, cut film can be moved without damage to the film, with extremely rapid almost instantaneous acceleration, to speeds of from about 100 inches per second to as high as 2,000 inches per second, although usually lower speeds, as in the neighborhood of 600 inches to 1,000 inches per second are used for average subjects.

In existing image motion compensation cameras, using strip film, the approximate top speed is 2,000 inches per second; at such speed, about 100 feet of film is used up in less than a second. Moreover, with such cameras, it is not possible to accelerate or decelerate the film propelling mechanism and the long length of film sufficiently quickly to avoid using up substantial lengths of the film merely in accelerating and decelerating.

On the other hand, in apparatus of the present invention, all heavier parts of the camera used in moving the film piece during photography are moving at the predetermined speed before film motion is started. Although acceleration is substantial, the film is sufficiently strong for its weight so that it can take accelerations up to 4,000 to 8,000 g's.

Apparatus embodying the present invention permits the photographing of large outdoor objects by ambient light, which is advantageous in comparison to cameras using fast flash, on the order of one-half microsecond, on stationary film. It is very difficult to provide and operate conventional front shutter cameras faster than about 1/1,000 of a second, and a ½ microsecond flash is therefore only 1/2,000 of the total shutter open time. Consequently, ambient light of even 1/2,000 of the intensity of the flash would be a serious competitor to the flash in exposing the film.

On the other hand, slot photography according to the present invention by exposing through a stationary slot on a moving film, provides important advantages. According to the invention a slot as narrow as 0.005 inches in combination with a 2,000 inches per second film speed is practical and provides an accurate exposure time of 2.5 microseconds. If the deviation between the image speed is 5% or less, the slot camera of the present invention has a blur-reducing ability equivalent to that of a 2.5/20 microsecond strobe light. Moreover, at the film speed mentioned, assuming the film length as 3 inches, the film length passes the slot in about a millisecond, so that intense light if necessary can be thrown on the object being photographed from masses conventional flash bulbs or from an electric arc or other suitable means.

Apparatus of the present invention, in which it is possible to move the film essentially at the speed of the image and where the object motion is primarily unidirectional, provides important advantages over conventional cameras, whether the means to freeze the image on the film is a slot with the moving film as in the camera of FIGS. 1 to 5 inclusive, or a wide open shutter and not slot as in the camera of FIG. 8, or an electronic flash with either of these types of the cameras.

Since electronic flash is fast enough to stop the motion of the image, that is to provide blur of less than 3/1,000 of an inch on small film, a flash of the same intensity can, with camera apparatus of the present invention, be used for an interval 20 times as long as conventional cameras making possible an adequate exposure of hard-to-light objects and those requiring greater depth of field. For example, the factor of 20 is 4.5 $f$ stops, and permits the use of $f$ 16 instead of $f$ 3.5 as a lens setting with consequent improvement in the depth of field.

There are other types of image motion compensating cameras that do not use strip film, such as drum cameras or prism cameras; they also have limitations, either lacking convenience or optical excellence, or being excessively expensive.

Cameras embodying the invention can use fixed lenses such as those available on moderately priced 35mm. single lens reflex cameras, can use commercially available cut film, and can permit the sequence of negatives and exposures at very short intervals.

Consequently, cameras embodying the present invention can permit exposures during a single photographic session with no change in camera setting or condition. Commercially available cut film can be used with economy and processing ease. Cameras embodying slots or full view or full frame exposure can be used with continuous light or electronic flash. Conventional lenses may be used with either focal plane or reflex focusing methods.

Ease of synchronizing of the film image is simple but of high accuracy. The film transit speed preferably is continuously adjustable preferably from about 100 inches per second to 2000 inches per second, as is indicated by the speed indicator. A sizeable number of cut films can be stored in the magazine for use; the receiver can receive the film without damage. Prior to exposure there is no film in the focal plane of the camera; consequently, the image can be easily examined for frame content and focus.

The camera can be manufactured at a low cost, and can be made rugged and simple in construction and operation, with consequent reduction in maintenance problems or loss of operability.

Other advantages will be apparent to those skilled in the art.

While the invention has been illustrated and described with respect to specific embodiments of the apparatus and method thereof, it will be understood that variations and modifications may be made in the form and arrangement of the several parts or the elements thereof, and in the processes for using the apparatus, without departing from the spirit of the invention. The invention therefore is not to be limited to the particular structure or procedures herein disclosed nor in any manner that is inconsistent with the extent to which the progress in the art has been advanced by the invention.

I claim:

1. Camera apparatus for making a photographic image on a piece of cut photographic film while it is moving, comprising a body having an interior chamber; a lens mounted on said body and adapted to project an image into said chamber; means for guiding an individual cut film piece in a fixed path of travel in said chamber past said lens; means for propelling said individual film piece at a predetermined speed in said fixed path past said lens, said propelling means comprising two rolls that between them grip said film piece to propel it past said lens without substantial slippage, and means for rotating at least one of said rolls prior to entry of a film piece therebetween at a speed that will accelerate and propel said film piece at said predetermined speed past said lens; a light-tight supply chamber for storing a plurality of unexposed cut film pieces; means for sequentially individually positioning each of said individual unexposed film pieces in a substantially stationary condition at a location where it can enter said path of travel; and means for moving said film piece from said location to said propelling means so said propelling means can engage said film piece, accelerate it to said predetermined speed, and move said film piece in said path past said lens.

2. The apparatus of claim 1 in which the speed of said rotatable rolls is adjustable.

3. The apparatus of claim 1 in which there are two such lenses and two such associated slots, and which includes light-tight means separating each lens and its associated slot from the other lens and its associated slot.

4. Apparatus for feeding generally planar individual photographic cut film pieces not mounted in holders, comprising a housing having a light-tight interior chamber; means in said chamber for holding a plurality of said individual cut film pieces in spaced parallel relation by engaging only the edges of said individual cut film pieces themselves; means for actuating said holding means to move each individual film piece sequentially to a first position substantially normal to its generally planar configuration where it is aligned with a predetermined path of travel for said film piece; first means for laterally moving said individual cut film piece in a direction generally parallel to its planar configuration to a second position where said film piece is aligned with said path of travel; means directly engaging an edge of said individual cut film piece for restraining said film piece against movement along said path of travel while said film piece is in said second position; means for causing said restraining means to release said individual film piece; and second means directly engaging an edge of said individual cut film piece for laterally moving said released individual cut film piece along said path of travel.

5. Camera apparatus for making a photographic image on a piece of cut photographic film while it is moving, comprising a body having an interior chamber; a plurality of lenses mounted on said body and adapted to project images into said chamber; guide means in said body adapted to be slidably engaged by opposite edges of an individual unexposed cut film piece alone and to guide said film piece in a fixed path of travel in said chamber past said lenses; means for propelling said individual film piece alone at a predetermined speed of at least 100 inches per second in said fixed path past said lenses after said propelling means engages said individual film piece; means for driving said propelling means, before it engages said individual film piece, at a speed such that after said propelling means engages said film piece said film piece will move at said predetermined speed; means for positioning said film piece in a substantially stationary condition at a location where its said opposite edges can slidably engage said guide means and said film piece alone can enter said path of travel but where it is not engaged by said propelling means; means for moving said film piece along from said location to said propelling means so said propelling means can engage said film piece alone, said means for moving said film piece cooperating with said propelling means to accelerate said film piece substantially instantaneously to said predetermined speed, and enable said propelling means to move said film piece alone at said predetermined speed in said path of travel in said guide means and past said lenses, said guide means and said means for moving said film piece acting to move and guide said film piece itself without use of any holder means for the film piece that holds said film piece and moves it; and a partition between said lenses and said path of travel of said film piece, said lenses being arranged with their optical axes at an angle, and said partition having a plurality of slots, one associated with each of said lenses, each of which slots intersects the optical axis of the associated lens.

6. The apparatus of claim 5 in which said camera apparatus has a plurality of lenses arranged with their optical axes at an angle, and in which said partition has a plurality of slots, one associated with each of said lenses, each of which slots intersects the optical axis of the associated lens.

7. Camera apparatus for making a photographic image on a piece of cut photographic film while it is moving, comprising a body having an interior chamber; a lens mounted on said body and adapted to project an image into said chamber; means for guiding an individual cut film piece in a fixed path of travel in said chamber and past said lens; means for propelling said individual film piece at a predetermined speed in said fixed path past said lens; a light-tight supply chamber for storing a plurality of unexposed cut film pieces; means for sequentially individually positioning each of said individual film pieces in a substantially stationary condition at a location where it can enter said path of travel; means for moving said film piece from said location through said propelling means so said propelling means can engage said film piece, and accelerate it to said predetermined speed, and move it in said path past said lens; and means for receiving a film piece after it has been exposed and leaves said path of travel, said means comprising a generally cylindrical chamber into which said exposed film piece is projected by said propelling means and which brings said film piece to a halt and contains it within a light-tight environment, the interior of said generally cylindrical chamber being lined with a material which decelerates the film piece without damaging it.

8. Camera apparatus for making photographic image on a piece of cut photographic film while it is moving, comprising a body having an interior chamber; a lens mounted on said body adapted to project an image into said chamber; means for guiding an individual cut film piece in a fixed path of travel in said chamber past said lens; means for propelling said individual film piece at a predetermined speed of at least 100 inches per second in a fixed path past said lens; a film supply magazine comprising a housing having a light-tight interior, means in said housing for storing a plurality of individual cut film pieces in spaced parallel relation, means for sequentially moving each individual cut film piece to a position in which it is aligned with said path of travel of said film piece, first means for laterally moving said first piece to said location where it can enter said path of travel, means for restraining said film piece at said location against movement to said propelling means, means for causing said restraining means to release said film piece, and second means for laterally moving said released film piece towards said propelling means to permit it to be engaged by said propelling means, said second means for laterally moving said film piece cooperating with said propelling means to accelerate said film piece substantially instantaneously to said predetermined speed to enable said propelling means to move said film piece at said predetermined speed in said path past said lens, said means for guiding said film piece in said means for moving said film piece acting to move and guide said film piece itself without the use of any holder means for the film piece that holds the film piece and moves with it.

9. The apparatus of claim 8 in which said housing is demountably mounted on said body in light-tight relation.

10. Apparatus for feeding generally planar individual photographic cut film pieces not mounted in holders, comprising a housing having a light-tight interior chamber; means in said chamber for storing a plurality of said cut film pieces in spaced parallel relation; means for moving each individual film piece generally to a first position substantially normal to its generally planar configuration where it is aligned with a predetermined path of travel for said film piece; first means for laterally moving said film piece in a direction generally parallel to its planar configuration to a second position where said film piece is aligned with said path of travel; means for restraining said film piece against movement along said path of travel while said film piece is in said second position; means for causing said restraining means to release said film piece; and second means for laterally moving said released film piece along said path of travel, said second means comprising resilient means that engages an edge of said film piece and is compressed when said film piece is restrained while in said second position, and that by resiliency of said resilient means laterally moves said film piece along said path of travel when said restraining means releases said film piece.

* * * * *

UNITED STATES PATENT OFFICE
CERTIFICATE OF CORRECTION

PATENT NO. : 3,925,796
DATED : December 9, 1975
INVENTOR(S) : JOHN J. TAYLOR

It is certified that error appears in the above—identified patent and that said Letters Patent are hereby corrected as shown below:

Column 4, line 19, change "each" to --such--.

Column 7, line 46, change "lenses" to --lens--.

Column 9, line 22, change "masses" to --massed--;

line 32, change "not" to --no--;

line 56, after "permit" insert --many--.

Signed and Sealed this thirtieth Day of March 1976

[SEAL]

Attest:

RUTH C. MASON
Attesting Officer

C. MARSHALL DANN
Commissioner of Patents and Trademarks